(12) United States Patent
Terada et al.

(10) Patent No.: US 8,394,549 B2
(45) Date of Patent: Mar. 12, 2013

(54) NONWOVEN FABRIC AND ELECTROLYTE MEMBRANE

(75) Inventors: Ichiro Terada, Tokyo (JP); Seigo Kotera, Tokyo (JP); Kazuo Hamazaki, Tokyo (JP); Shigeru Aida, Tokyo (JP); Ken Iruya, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/194,241

(22) Filed: Jul. 29, 2011

(65) Prior Publication Data

US 2011/0281196 A1 Nov. 17, 2011

Related U.S. Application Data

(63) Continuation of application No. PCT/JP2010/052999, filed on Feb. 25, 2010.

(30) Foreign Application Priority Data

Feb. 26, 2009 (JP) .................................. 2009-044704

(51) Int. Cl.
*H01M 8/10* (2006.01)
*B01J 49/00* (2006.01)
*C08J 5/20* (2006.01)
*B28B 3/20* (2006.01)
*B29C 47/00* (2006.01)

(52) U.S. Cl. .................... 429/479; 521/27; 264/176.1

(58) Field of Classification Search .................. 429/479, 429/33; 521/127, 27; 264/176.1
See application file for complete search history.

(56) References Cited

U.S. PATENT DOCUMENTS

| 7,569,616 | B2 | 8/2009 | Kotera et al. | |
|---|---|---|---|---|
| 7,927,690 | B2 * | 4/2011 | Taguchi et al. | 428/219 |
| 2004/0058152 | A1 * | 3/2004 | Tokarsky et al. | 428/373 |
| 2006/0159973 | A1 * | 7/2006 | Kotera et al. | 429/33 |
| 2007/0232754 | A1 * | 10/2007 | Aida et al. | 525/199 |
| 2009/0214924 | A1 | 8/2009 | Kotera et al. | |
| 2010/0096769 | A1 | 4/2010 | Terada et al. | |

FOREIGN PATENT DOCUMENTS

| JP | 07-229048 | 8/1995 |
|---|---|---|
| JP | 2002-266219 | 9/2002 |
| JP | 2007-18995 | 1/2007 |

OTHER PUBLICATIONS

Fluon® ETFE Polymer Product Information ASAHI GLASS © 1996-2012.*
Housmans (Masters Thesis, May 2003 Endhoven University of Technology {http://www.mate.tue.nl/mate/pdfs/2895.pdf}).*
Spruiell et al. Polymer Engineering and Science vol. 15 No. 9 pp. 660-667.*
Kwei et al. Journal of Applied Physics vol. 38 pp. 2512-2156 1967.*
International Search Report issued Apr. 6, 2010 in PCT/JP2010/052999 filed Feb. 26, 2009.

* cited by examiner

*Primary Examiner* — Patrick Ryan
*Assistant Examiner* — Aaron Greso
(74) *Attorney, Agent, or Firm* — Oblon, Spivak, McClelland, Maier & Neustadt, L.L.P.

(57) ABSTRACT

To obtain a nonwoven fabric which is excellent in the heat resistance and the chemical resistance, of which the fiber diameter is small, and which is excellent in the mechanical strength at a temperature at which it is used; and an electrolyte membrane which is excellent in the dimensional stability when it is swollen by water, and of which an increase in the resistance by a reinforcing material is suppressed.

A nonwoven fabric 28 containing fibers 26 of an ethylene/tetrafluoroethylene copolymer having a storage elastic modulus E' at 25° C. of at least $8 \times 10^8$ Pa and a melt viscosity measured at 300° C. of higher than 60 Pa·s and at most 300 Pa·s, wherein the average fiber diameter of the fibers is from 0.01 to 3 μm; and an electrolyte membrane reinforced by the nonwoven fabric 28.

10 Claims, 3 Drawing Sheets

Fig. 3
Fig. 4
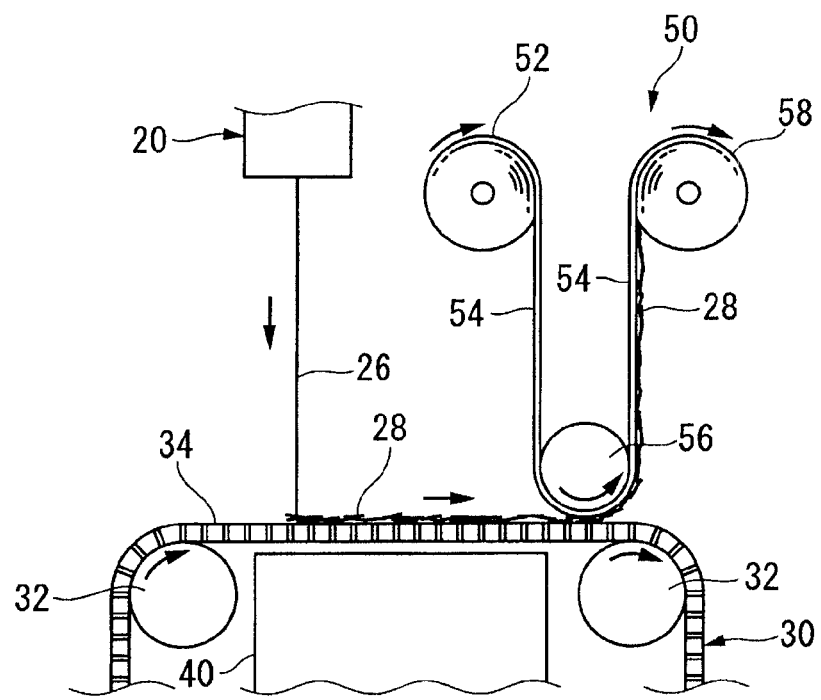
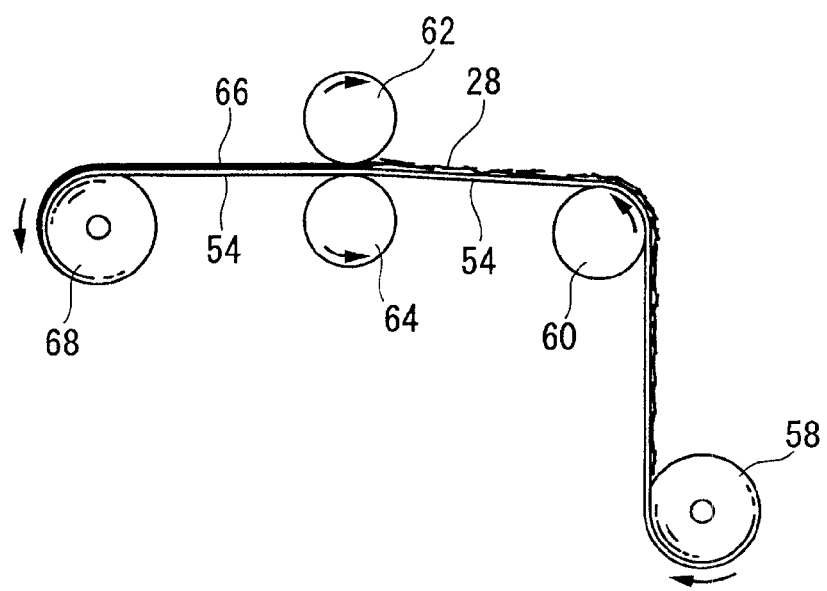

NONWOVEN FABRIC AND ELECTROLYTE MEMBRANE

TECHNICAL FIELD

The present invention relates to a nonwoven fabric and an electrolyte membrane reinforced by the nonwoven fabric.

BACKGROUND ART

A nonwoven fabric has been used as a web of fibers useful for filters (such as air filters and bag filters), separators for cells (such as nickel-hydrogen cells, nickel-cadmium cells and lithium ion cells), reinforcing materials of substrates for printed circuit boards, reinforcing materials of electrolyte membranes, etc.

As materials for the nonwoven fabric, general-purpose materials such as polypropylene, polyester or polyamide have been used. However, in recent years, a fluororesin which is excellent in heat resistance, chemical resistance, non-stickiness, etc. has been used as a material for a separator of a cell, a high performance filter for air cleaning or a filter for filtration of a chemical in the field of semiconductors, a bag filter for anti-pollution measures, etc.

As the nonwoven fabrics made of a fluororesin, the following have been known.

(1) A nonwoven fabric obtained by stretching polytetrafluoroethylene, cutting it and forming it into fibers, followed by a water jet method or a needle punching method to make the fibers cross each other.

(2) A nonwoven fabric obtained by meltblowing an ethylene/chlorotrifluoroethylene copolymer (Patent Document 1).

(3) A nonwoven fabric obtained by meltblowing a tetrafluoroethylene copolymer (Patent Document 2).

(4) A nonwoven fabric obtained by meltblowing an ethylene/tetrafluoroethylene copolymer (hereinafter referred to as ETFE) (Patent Document 3).

However, the strength of the nonwoven fabric (1) is insufficient, since fibers are not mutually fused.

The nonwoven fabric (2) is insufficient in the chemical resistance, the water repellency, the stain proofing property, the mold release property, etc.

The tetrafluoroethylene copolymer as the material of the nonwoven fabric (3) has a low elastic modulus at around room temperature at which the nonwoven fabric is to be used, and accordingly the nonwoven fabric is insufficient in the mechanical strength.

On the other hand, ETFE which is the material of the nonwoven fabric (4) has a high elastic modulus at around room temperature at which the nonwoven fabric is to be used, and has excellent heat resistance, chemical resistance and non-stickiness. However, in a case where a nonwoven fabric is produced by meltblowing ETFE for general forming, since the melt viscosity of ETFE is high, the average fiber diameter of the fibers that make up the nonwoven fabric tends to be large. As a result, if such a nonwoven fabric is used to reinforce an electrolyte membrane, the electrolyte membrane tends to be thick, and the resistance will be increased. Further, when such a nonwoven fabric is used as a filter for removing fine particles, the maximum pore diameter tends to be large, whereby the fine particle removing performance will be insufficient.

PRIOR ART DOCUMENTS

Patent Documents

Patent Document 1: JP-A-7-229048
Patent Document 2: JP-A-2002-266219
Patent Document 3: JP-A-2007-18995

DISCLOSURE OF INVENTION

Technical Problem

It is an object of the present invention to provide a nonwoven fabric which is excellent in the heat resistance and the chemical resistance, of which the fiber diameter is small, and which is excellent in the mechanical strength at a temperature at which it is used; and a reinforced electrolyte membrane which is excellent in the dimensional stability when it is swollen by water, and of which an increase in the resistance by a reinforcing material is suppressed.

Solution to Problem

The nonwoven fabric of the present invention contains fibers of an ethylene/tetrafluoroethylene copolymer having a storage elastic modulus E' at 25° C. of at least $8 \times 10^8$ Pa and a melt viscosity measured at 300° C. of higher than 60 Pa·s and at most 300 Pa·s, wherein the average fiber diameter of the fibers is from 0.01 to 3 μm.

The unit weight of the nonwoven fabric of the present invention is preferably from 1 to 300 $g/m^2$.

The nonwoven fabric of the present invention is preferably produced by meltblow process.

The nonwoven fabric of the present invention is preferably such that at least part of intersections among the fibers are fixed by fusion.

The above fusion is carried out preferably by hot pressing.

The maximum strength in the machine direction of the nonwoven fabric of the present invention is preferably at least 60 N/10 cm when unit weight of the nonwoven fabric is 100 $g/m^2$.

The maximum hardness in the machine direction of the nonwoven fabric of the present invention is preferably at least 400 N/10 cm when unit weight of the nonwoven fabric is 100 $g/m^2$.

In the nonwoven fabric of the present invention, the ethylene/tetrafluoroethylene copolymer preferably comprises repeating units based on a monomer represented by $CH_2=CX(CF_2)_nY$ (wherein each of X and Y is a hydrogen atom or a fluorine atom, and n is an integer of from 2 to 8), and the content of the repeating units based on the monomer is preferably from 0.1 to 7 mol % based on the total repeating units of the ethylene/tetrafluoroethylene copolymer.

The electrolyte membrane of the present invention is reinforced by the nonwoven fabric of the present invention.

Advantageous Effects of Invention

The nonwoven fabric of the present invention is excellent in the heat resistance and the chemical resistance, has a small fiber diameter and is excellent in the mechanical strength at a temperature at which it is used.

The electrolyte membrane of the present invention is excellent in the dimensional stability when it is swollen by water, whereby an increase in the resistance by a reinforcing material is suppressed.

BRIEF DESCRIPTION OF DRAWINGS

FIG. 3 is an enlarged view illustrating a state of production of a nonwoven fabric using the nonwoven fabric production apparatus shown in FIG. 1.

FIG. 4 is a view schematically illustrating a state of hot pressing a nonwoven fabric to adjust the thickness (densification).

DESCRIPTION OF EMBODIMENTS

<Nonwoven Fabric>

Figure 1:
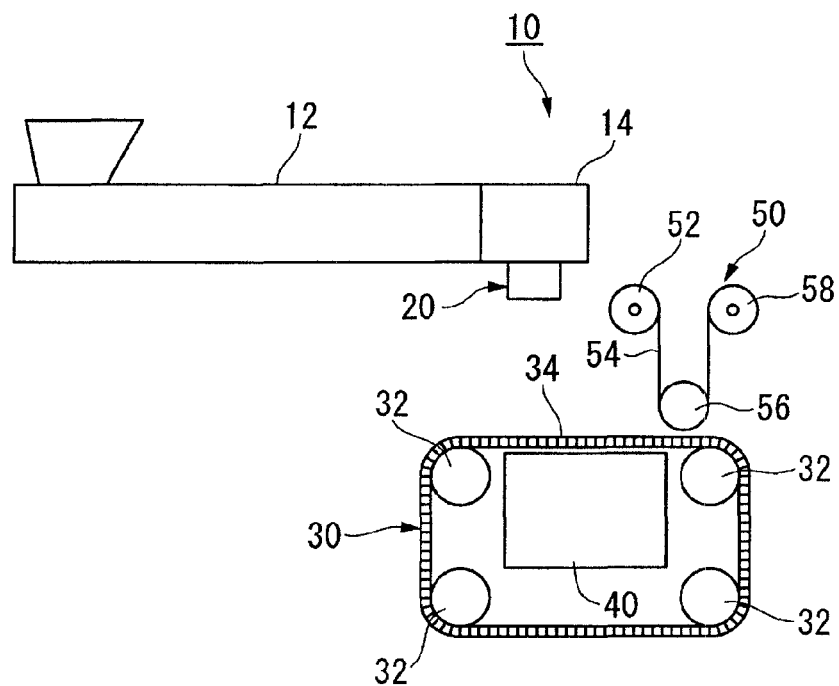
FIG. 1 is a schematic view illustrating one example of a nonwoven fabric production apparatus by meltblow process.

The nonwoven fabric of the present invention contains fibers of ETFE having a storage elastic modulus E' at 25° C. of at least $8 \times 10^8$ Pa and a melt viscosity measured at 300° C. of higher than 60 Pa·s and at most 300 Pa·s.

(Storage Elastic Modulus)

When the storage elastic modulus E' at 25° C. is at least $8 \times 10^8$ Pa, the mechanical strength of the nonwoven fabric will be sufficiently high, and the nonwoven fabric is hardly broken during its use. Further, the dimensional stability of an electrolyte membrane reinforced by the nonwoven fabric when it is swollen by water will be good.

The storage elastic modulus E' is determined by measuring dynamic viscoelasticity of a film-shape sample of ETFE by using a dynamic viscoelasticity measuring apparatus. Measurement of the dynamic viscoelasticity is a method of sandwiching the film-shape sample between chucks, applying a strain or a stress which changes (swings) with time, and measuring the stress or the strain generated thereby, to measure dynamic properties of the sample.

As a method of adjusting the storage elastic modulus E' at 25° C. of ETFE to at least $8 \times 10^8$ Pa, a method of changing the copolymer compositional ratio of ethylene/tetrafluoroethylene, or a method of adjusting the content of another monomer may, for example, be mentioned.

(Melt Viscosity)

When the melt viscosity measured at 300° C. exceeds 60 Pa·s, since the molecular weight is high, the mechanical strength of the nonwoven fabric will be sufficiently high. When the melt viscosity measured at 300° C. is at most 300 Pa·s, the formability will be good, the average fiber diameter of the nonwoven fabric will be small, and the fiber diameter distribution will be small. The melt viscosity measured at 300° C. is preferably from 65 to 200 Pa·s.

The melt viscosity (melt flowability) is preferably measured by a capillary rheometer. This apparatus is to measure the stress required to extrude a molten resin at a constant rate to let the resin pass through a capillary and be extruded. A lower melt viscosity of ETFE means a low molecular weight of ETFE, and a high melt viscosity of ETFE means a high molecular weight of ETFE.

The melt viscosity (melt flowability) of ETFE is specifically measured by setting an orifice having a diameter of 1 mm and a length of 10 mm to a melt flowability measuring apparatus (manufactured by Toyo Seiki Seisaku-sho, Ltd., Capirograph, inner diameter: 9.55 mm) at a cylinder temperature of 300° C. at a piston speed of 10 mm/min.

The temperature at which ETFE is melted is preferably a temperature higher by from 5 to 30° C. than the melting point of ETFE. By melting ETFE at a temperature higher by at least 5° C. than the melting point of ETFE, ETFE will sufficiently be melted, and the measurement will easily be carried out. However, if the temperature at which ETFE is melted is too high, the viscosity of ETFE tends to be too low, and molten ETFE will flow out of the orifice in a short time, whereby the measurement tends to be difficult.

The melting point of ETFE is specifically obtained from the endothermic peak obtained when ETFE is heated in an air atmosphere from room temperature to 300° C. at a rate of 10° C./min by means of a differential scanning calorimeter (DSC220CU), manufactured by Seiko Instruments Inc.).

As a method of adjusting the melt viscosity (melt flowability) of ETFE, the following methods may be mentioned.

(1) A method of adjusting the molecular weight by e.g. the concentration of a chain transfer agent at the polymerization, the polymerization pressure, or the amount of ETFE based on a polymerization medium at the completion of the polymerization reaction.

(2) A method of applying an energy of e.g. heat or radioactive rays to ETFE to cleave molecules thereby to lower the viscosity.

(3) A method of chemically cutting the molecular chain of ETFE by radicals. Specifically, ETFE and an organic peroxide are melt-kneaded by an extruder to cut the molecular chain of ETFE by the generated radicals thereby to lower the viscosity.

In the methods (2) and (3), active functional groups such as carbonyl groups may form at the cut moiety in ETFE, whereby the chemical stability may be decreased. Accordingly, a method of (1) by which no active functional groups will be formed, and which provides high productivity, is preferred.

(Average Fiber Diameter)

The average fiber diameter of the fibers constituting the nonwoven fabric is from 0.01 to 3 μm, more preferably from 0.01 to 2 μm. When the average fiber diameter of the fibers is at least 0.01 μm, the tensile strength per one fiber will be high, whereby good handling properties will be obtained. When the average fiber diameter of the fibers is at most 3 μm, the maximum pore size of the nonwoven fabric can be reduced.

(Unit Weight)

The unit weight of the nonwoven fabric is preferably from 1 to 300 g/m², more preferably from 1 to 50 g/m², further preferably from 1 to 10 g/m². When the unit weight of the nonwoven fabric is at least 1 g/m², a strength to maintain the shape as a nonwoven fabric can be secured. When the unit weight of the nonwoven fabric is at most 300 g/m², the strength is maintained, and the nonwoven fabric can be used as a filter or an electrolyte membrane reinforcing material without remarkably increasing the permeation resistance.
(Maximum Strength)

The maximum strength of the nonwoven fabric in the machine direction when unit weight of the nonwoven fabric is 100 g/m² is preferably at least 60 N/10 cm, more preferably at least 70 N/10 cm, further preferably from 75 N/10 cm to 120 N/10 cm. When the maximum strength is at least 60 N/10 cm, the mechanical strength of the nonwoven fabric will be sufficiently high, and good handling property will be obtained.

The maximum strength in the machine direction when unit weight of the nonwoven fabric is 100 g/m² is a value obtained by calculating the maximum value of a force in a force-strain curve obtained by measuring the tensile strength property of a nonwoven fabric (width: 10 cm) with a specific unit weight, when unit weight of the nonwoven fabric is 100 g/m², and the "machine direction" means a direction of a machine when a nonwoven fabric is continuously prepared.
(Maximum Hardness)

The maximum hardness of the nonwoven fabric in the machine direction when unit weight of the nonwoven fabric is 100 g/m² is preferably at least 400 N/10 cm, more preferably from 600 N/10 cm to 1,200 N/10 cm. When the maximum hardness is at least 400 N/10 cm, good handling property of the nonwoven fabric will be obtained, and the dimensional stability of an electrolyte membrane reinforced by the nonwoven fabric when it is swollen by water will be good.

The maximum hardness in the machine direction when unit weight of the nonwoven fabric is 100 g/m² is a value obtained by calculating the maximum value of an initial gradient relative to the strain of a force in a force-strain curve obtained by measuring the tensile strength property of a nonwoven fabric (width: 10 cm) with a specific unit weight, when unit weight of the nonwoven fabric is 100 g/m², and the "machine direction" means a direction of a machine when a nonwoven fabric is continuously prepared.
(ETFE)

ETFE may be used alone or as a mixture of two or more.

In the case of a mixture of two or more, the storage elastic modulus E' at 25° C. and the melt viscosity measured at 300° C. of the mixture should be within the above ranges.

ETFE preferably comprises repeating units based on ethylene (hereinafter referred to as E) and repeating units based on tetrafluoroethylene (hereinafter referred to as TFE) with a molar ratio of the repeating units based on E to the repeating units based on TFE (repeating units based on E/repeating units based on TFE) of from 20/80 to 80/20, more preferably from 40/60 to 60/40, further preferably from 42/58 to 50/50. If the molar ratio is extremely high, the heat resistance, the weather resistance, the chemical resistance, etc. of ETFE may be decreased in some cases. If the molar ratio is extremely low, the mechanical strength, the melt forming property, etc. may be decreased in some cases.

ETFE may contain at least one type of repeating units based on another monomer within a range not to impair essential properties.

Such another monomer may, for example, be an α-olefin (such as propylene, n-butene or isobutene), a compound represented by $CH_2=CX(CF_2)_nY$ (wherein each of X and Y is a hydrogen atom or a fluorine atom, and n is an integer of from 2 to 8) (hereinafter referred to as FAE), a fluoroolefin having a hydrogen atom in an unsaturated group (such as vinylidene fluoride, vinyl fluoride, trifluoroethylene or hexafluoroisobutylene), a fluoroolefin having no hydrogen atom in an unsaturated group (such as hexafluoropropylene, chlorotrifluoroethylene, perfluoro(methyl vinyl ether), perfluoro(ethyl vinyl ether), perfluoro(propyl vinyl ether), perfluoro(butyl vinyl ether) or another perfluoro(alkyl vinyl ether), provided that TFE is excluded).

Such another monomer may be used alone or in combination of two or more.

The content of the repeating units based on another monomer is preferably from 0.01 to 10 mol %, more preferably from 0.1 to 7 mol %, further preferably from 0.4 to 4 mol % based on the total repeating units in ETFE.

Such another monomer is preferably FAE.

When n in the formula of FAE is at least 2, sufficient properties (e.g. stress crack resistance of a formed product) of ETFE will be obtained. When n is at most 8, favorable polymerization reactivity will be obtained.

FAE may, for example, be $CH_2=CF(CF_2)_2F$, $CH_2=CF(CF_2)_3F$, $CH_2=CF(CF_2)_4—F$, $CH_2=CF(CF_2)_5F$, $CH_2=CF(CF_2)_8F$, $CH_2=CF(CF_2)_2H$, $CH_2=CF(CF_2)_3H$, $CH_2=CF(CF_2)_4H$, $CH_2=CF(CF_2)_5H$, $CH_2=CF(CF_2)_8H$, $CH_2=CH(CF_2)_2F$, $CH_2=CH(CF_2)_3F$, $CH_2=CH(CF_2)_4F$, $CH_2=CH(CF_2)_5F$, $CH_2=CH(CF_2)_8F$, $CH_2=CH(CF_2)_2H$, $CH_2=CH(CF_2)_3H$, $CH_2=CH(CF_2)_4H$, $CH_2=CH(CF_2)_5H$ or $CH_2=CH(CF_2)_8H$.

FAE may be used alone or in combination of two or more.

FAE is preferably a compound represented by $CH_2=CH(CF_2)_nY$, more preferably the compound wherein n is an integer of from 2 to 6 in view of excellent stress crack resistance of a formed product, further preferably the compound wherein n is an integer of from 2 to 4. Particularly preferred is one wherein Y is F, and n is an integer of from 2 to 6.

The content of the repeating units based on FAE is preferably from 0.01 to 10 mol %, more preferably from 0.1 to 7 mol %, further preferably from 0.4 to 4 mol % based on the total repeating units of ETFE. When the content of FAE is at least 0.01 mol %, favorable stress crack resistance of a formed product will be obtained, and a breaking phenomenon such as cracking under stress is less likely to occur. When the content of FAE is at most 10 mol %, favorable mechanical strength will be obtained.

As the method for producing ETFE, a method of introducing E and TFE and as the case requires, another monomer to a reactor, and copolymerizing them by means of a radical polymerization initiator and a chain transfer agent.

The polymerization method may, for example, be a bulk polymerization method, a solution polymerization method using an organic solvent as a polymerization medium; a suspension polymerization method using as a polymerization medium an aqueous medium and as the case requires, an appropriate organic solvent; or an emulsion polymerization method using an aqueous medium as a polymerization medium and an emulsifier, and preferred is a solution polymerization method of copolymerizing E and TFE and as the case requires, another monomer in the presence of a radical polymerization initiator, a chain transfer agent and a polymerization medium.

The polymerization may be carried out in a batch system or in a continuous system by using single reactor or multi reactor system stirring type polymerization apparatus, tubular type polymerization apparatus, etc.

The radical polymerization initiator is preferably an initiator whereby the temperature at which the half-life period is 10 hours, is from 0 to 100° C., more preferably from 20 to 90° C.

The radical polymerization initiator may, for example, be an azo compound (such as azobisisobutyronitrile), a peroxydicarbonate (such as diisopropyl peroxydicarbonate), a peroxyester (such as tert-butyl peroxypivalate, tert-butyl peroxyisobutyrate or tert-butyl peroxyacetate), a non-fluorinated diacyl peroxide such as isobutyryl peroxide, octanoyl peroxide, benzoyl peroxide or lauroyl peroxide), a fluorinated diacyl peroxide (such as $((W(CF_2)_rCOO)_2$, wherein W is a hydrogen atom, a fluorine atom or a chlorine atom, and r is an integer of from 1 to 10)), or an inorganic peroxide such as potassium persulfate, sodium persulfate or ammonium persulfate).

The chain transfer agent may, for example, be an alcohol (such as methanol or ethanol), a fluorinated chlorohydrocarbon (such as 1,3-dichloro-1,1,2,2,3-pentafluoropropane or 1,1-dichloro-1-fluoroethane) or a hydrocarbon (such as pentane, hexane or cyclohexane). The concentration of the chain transfer agent is usually at a level of from 0.01 to 100 mass % based on the polymerization medium. The melt viscosity (molecular weight) of ETFE can be adjusted by adjusting the concentration of the chain transfer agent. That is, the higher the concentration of the chain transfer agent, the lower the molecular weight of ETFE.

The polymerization medium may, for example, be an organic solvent such as a fluorinated hydrocarbon, a chlorinated hydrocarbon, a fluorinated chlorohydrocarbon, an alcohol or a hydrocarbon, or an aqueous medium.

In a case where ETFE having a low molecular weight is to be produced, it is preferred to use, as the polymerization medium, 1,3-dichloro-1,1,2,2,3-pentafluoropropane which is used as the chain transfer agent.

The polymerization temperature is usually preferably from 0 to 100° C., more preferably from 20 to 90° C.

The polymerization pressure is preferably from 0.1 to 10 MPa, more preferably from 0.5 to 3 MPa. The higher the polymerization pressure, the higher the molecular weight of ETFE, and the higher the melt viscosity. Accordingly, the melt viscosity can be adjusted by adjusting the polymerization pressure.

The polymerization time may vary depending on e.g. the polymerization temperature and the polymerization pressure, and is usually preferably from 1 to 30 hours, more preferably from 2 to 10 hours.

The amount of ETFE based on the polymerization medium when the polymerization reaction is completed is usually at a level of from 0.03 to 0.2 $g/cm^3$. The molecular weight of ETFE can be adjusted also by this concentration. That is, the lower the concentration of ETFE in this range, the lower the molecular weight of ETFE to be obtained.

(Process for Producing Nonwoven Fabric)

As a process for producing the nonwoven fabric of the present invention, known processes for producing nonwoven fabrics wherein continuous fibers are produced, such as spun bond process or meltblow process may be mentioned.

By the meltblow process, formation of fibers of ETFE and formation of a nonwoven fabric-shape product can be carried out substantially simultaneously, whereby a high productivity can be achieved. Further, the fibers of ETFE constituting the nonwoven fabric can be made very thin.

As a process for producing the nonwoven fabric by the meltblow process, for example, a process comprising the following steps may be mentioned.

(I) A step of discharging ETFE in a molten state from a fiber spinning nozzle and stretching it by an air stream to spin fibers, and collecting the fibers on e.g. a gas permeable film base material on a belt conveyor to obtain a continuous nonwoven fabric.

(II) A step of laminating the nonwoven fabric with a continuous resin film for transfer.

(III) A step of passing the continuous nonwoven fabric provided with the resin film between a pair of rolls, followed by hot pressing to adjust the thickness by densification.

Step (I)

The step (I) is carried out by means of known meltblow process.

FIG. 1 is a schematic view illustrating one example of a nonwoven fabric production apparatus by meltblow process. A nonwoven fabric production apparatus 10 comprises an extruder 12 to melt and extrude ETFE; a die 14 having a flow rate controlling structure and a hot air blowing structure, provided at the end portion of the extruder 12; a spinning nozzle 20 having a molten resin outlet and a gas outlet, provided downward from the die 14; a belt conveyor 30 provided below the spinning nozzle 20; a suction apparatus 40 provided inside the belt conveyor 30; and a nonwoven fabric recovering means 50 provided in the vicinity of the terminal of the top surface of the belt conveyor 30.

Figure 2:
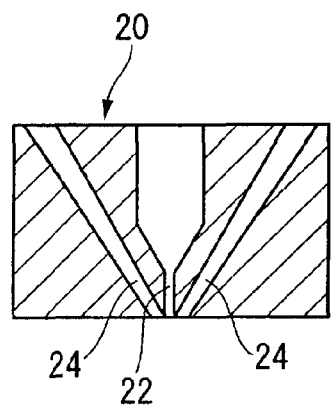
FIG. 2 is a cross sectional view illustrating one example of a spinning nozzle used in a nonwoven fabric production apparatus by meltblow process.

The spinning nozzle 20 comprises, as shown in FIG. 2, a plurality of molten resin outlets 22 penetrating in a vertical direction, arranged in a line along a direction at right angles to the moving direction of an endless belt of the belt conveyor 30; and slit-form gas outlets 24 lining along a direction at right angles to the moving direction of an endless belt of the belt conveyor 30, formed to sandwich the molten resin outlets 22. The slit width of each gas outlet 24 is preferably from 100 to 1,500 μm, more preferably from 200 to 1,000 μm, further preferably from 300 to 800 μm.

The belt conveyor 30 comprises four rolls 32 and a gas permeable film form base material 34 in the form of an endless belt put over the four rolls 22. The film form base material 34 may, for example, be a mesh, cloth or a porous material, and in view of a high melting temperature of ETFE, it is preferably a metal mesh, more preferably a stainless steel mesh. The opening of the mesh is preferably at most 2 mm, more preferably at most 0.15 mm, further preferably at most 0.06 mm, particularly preferably at most 0.03 mm.

A nonwoven fabric transfer means 50 comprises a roll 52 for a resin film; a transfer roll 56 to attach a nonwoven fabric formed on the surface of the film form base material 34 of the belt conveyor 30 to a resin film 54 sent out from the roll 52 for a resin film; and a roll 58 to wind the nonwoven fabric together with the resin film 54.

Production of a nonwoven fabric using the nonwoven fabric production apparatus 10 is carried out as follows.

ETFE in a molten state extruded from the extruder 12 is, after the flow rate is adjusted by the die 14, discharged downward from the molten resin outlets 22 of the spinning nozzle 20. Simultaneously, a heated gas supplied from the die 14 is discharged from the gas outlets 24 of the spinning nozzle 20, whereby an air stream is generated along ETFE in a molten state discharged from the molten resin outlets 22. By this air stream, ETFE in a molten state discharged from the molten resin outlets 22 is stretched and spun to form a very fine fiber.

As shown in FIG. 3, the very fine fiber 26 is sucked by the suction apparatus 40 by means of the film form base material 34 and collected on the surface of the moving film form base material 34 to continuously form a nonwoven fabric 28.

The nonwoven fabric 28 is sent to the vicinity of the terminal to the top surface of the belt conveyor 30 together with the film form base material 34.

As the nonwoven fabric 28 is formed on the surface of the continuously moving film form base material 34, it is continuously formed to be a continuous product. The nonwoven fabric 28 is sometimes obtained as a nonwoven fabric wherein part of intersections among the fibers are fused and fixed, when ETFE having a relatively low melt viscosity is used, and in some cases, it is obtained as a floccular nonwoven fabric without fusion of intersections among the fibers.

The temperature of the die 14 is preferably from 320 to 380° C., more preferably from 340 to 360° C. Within such a range, formation with a low pressure loss is possible.

The temperature of the heated gas discharged from the gas discharge outlets 24 is preferably from 320 to 400° C., more preferably from 330 to 390° C., further preferably from 340 to 380° C.

The amount of the heated gas discharged from the gas outlets 24 is preferably from 0.5 to 10 $Nm^3/hr$, more preferably from 1 to 7 $Nm^3/hr$, further preferably from 2 to 5 $Nm^3/hr$ per 1 cm of the nozzle.

In order that the fiber 26 is sufficiently sucked and held in the form of a nonwoven fabric, a wind speed of at least 0.1 m/sec is preferred in a distance within 1 cm from the surface of the film form base material 34.

Step (II)

As shown in FIG. 3, the nonwoven fabric 28 sent to the vicinity of the terminal of the top surface of the belt conveyor 30 together with the film form base material 34 is pressed against and attached to a resin film 54 by a transfer roll 56, the resin film 54 being sent out from a roll 52 for a resin film, and is wound on a roll 58 together with the resin film 54 and is recovered.

The material of the resin film 54 may, for example, be polyethylene terephthalate (hereinafter referred to as PET), polyethylene naphthalate, ETFE, polypropylene, polycarbonate, polyethylene, polyimide or a laminated film thereof, and in view of the heat resistance, the cost, etc., PET is preferred.

Step (III)

Since the nonwoven fabric 28 obtained together with the resin film 54 is bulky and thick, it is passed through a pair of rolls together with the resin film 54 to carry out hot pressing, to adjust the thickness by densification, and at the same time, in a case where intersections among the fibers are not fixed, part of the intersections among the fibers are fused and fixed.

As shown in FIG. 4, the nonwoven fabric 28 provided with the resin film sent out from the roll 58 is passed through a pair of heating rolls i.e. a metal roll 62 and a rubber roll 64 to be hot pressed, via a guide roll 60, thereby to be a nonwoven fabric 66 having its thickness adjusted, and is wound on a roll 68 for a nonwoven fabric together with the resin film 54.

The temperature of the heating rolls is preferably such a temperature range that the fibers can be fused without melt-deforming. In a case where the material of the fibers is ETFE, the temperature range is preferably from "melting point 31 85° C." to the melting point, more preferably from "melting point −70° C." to the melting point.

The pressure at the time of the hot pressing is preferably from 0.1 to 5 MPa, whereby the fibers can be fused without significant deformation. With respect to the pressure of roll pressing of this type by a metal roll and a rubber roll, since there is a deformation by the pressure of the rubber roll in general, the pressure calculated from the set pressure and the specification of a pressure cylinder attached to a nip roll is different from a pressure practically applied to an object to be pressed in many cases. Accordingly, a pressure practically applied can be measured by using e.g. a pressure measurement film "Prescale" manufactured by Fujifilm Corporation.

If the melt viscosity of ETFE at 300° C. is at most 60 Pa·s, the fibers tend to be crushed, and the pores of the nonwoven fabric tend to be clogged. In order that the fibers are not crushed, there may be method of controlling the temperature of the heating rolls or the pressure for hot pressing, but their tolerance tends to be narrow, thus leading to poor productivity. On the other hand, if the melt viscosity of ETFE at 300° C. exceeds 300 Pa·s, the nonwoven fabric will not sufficiently be densified, and adhesion to the resin film will also be decreased. If the temperature of the heating rolls is increased to solve the problems, the resin film starts to be deformed, and stable continuous production will be difficult.

To the nonwoven fabric, at least one treatment selected from the group consisting of radiation irradiation, plasma irradiation and chemical treatment by metal sodium may be applied. By such treatment, polar groups such as —COOH groups, —OH groups or —COF groups will be introduced to the surface of the fibers, whereby the adhesion at the interface of the nonwoven fabric and another material can be increased when they are laminated or bonded.

The above-described nonwoven fabric of the present invention, which comprises fibers of ETFE, is excellent in the heat resistance and the chemical resistance. Further, as it comprises fibers of ETFE having a storage elastic modulus E' at 25° C. of at least $8 \times 10^8$ Pa and a melt viscosity measured at 300° C. of higher than 60 Pa·s and at most 300 Pa·s, it has a small fiber diameter and is excellent in the mechanical strength at a temperature at which the nonwoven fabric is used.

<Electrolyte Membrane>

The electrolyte membrane of the present invention is an electrolyte membrane containing an ion exchange resin as the main component, reinforced by the nonwoven fabric of the present invention.

The thickness of the electrolyte membrane is, in a case where it is used as an electrolyte membrane for a polymer electrolyte fuel cell, preferably from 1 to 100 μm, more preferably from 3 to 50 μm, further preferably from 5 to 30 μm. When the thickness of the electrolyte membrane is at most 100 μm, the resistance can be suppressed low, and back diffusion of water formed on the cathode side is likely to occur. When the thickness of the electrolyte membrane is at least 1 μm, the mechanical strength can be sufficiently high, whereby drawbacks such as gas leakage can be suppressed.

The thickness of the nonwoven fabric is preferably from 0.5 to 40 μm, more preferably from 1 to 20 μm, further preferably from 2 to 10 μm in view of the thickness of the electrolyte membrane. The unit weight of the nonwoven fabric in such a case is preferably from 2 to 20 $g/m^2$ so as to satisfy both the reinforcing effect and reduction in the membrane resistance.

(Ion Exchange Resin)

The ion exchange resin may, for example, be a cation exchange resin made of a hydrocarbon polymer or a cation-exchange resin-made of a partially fluorinated hydrocarbon polymer, and in view of excellent durability, a sulfonic acid type perfluorocarbon polymer is preferred. The perfluorocarbon polymer may have etheric oxygen atoms or the like.

The ion exchange resins may be used alone or in combination of two or more.

As the sulfonic acid type perfluorocarbon polymer, a known sulfonic acid type perfluorocarbon polymer may be used.

The sulfonic acid type perfluorocarbon polymer is obtainable by hydrolyzing a perfluorocarbon polymer (hereinafter referred to as a precursor) having $SO_2F$ groups, followed by conversion to an acid form.

The precursor is preferably a copolymer having repeating units based on a monomer represented by the following formulae (1) to (6) and repeating units based on a perfluoroolefin (such as TFE or hexafluoropropylene), chlorotrifluoroethylene or perfluoro(alkyl vinyl ether), more preferably a copolymer having repeating units based on a monomer represented by the following formulae (1) to (6) and repeating monomer units based on TFE. The precursor may have two or more types of repeating units based on monomers represented by the following formulae (1) to (6).

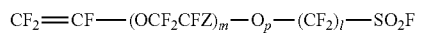  (1)

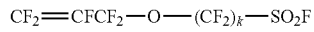  (2)

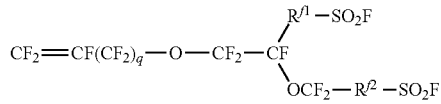  (3)

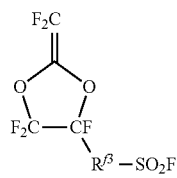  (4)

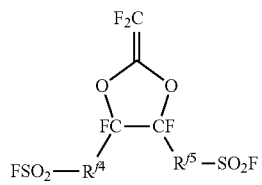  (5)

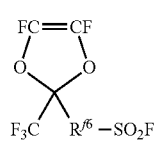  (6)

In the above formulae, Z is a fluorine atom or a trifluoromethyl group, l is an integer of from 1 to 12, m is an integer of from 0 to 3, p is 0 or 1, and m+p is an integer of at least 1; k is an integer of from 2 to 6; each of $R^{f1}$ and $R^{f2}$ is a single bond or a $C_{1-6}$ linear perfluoroalkylene group (which may have an etheric oxygen atom), and q is 0 or 1; $R^{f3}$ is a $C_{1-6}$ perfluoroalkylene group; each of $R^{f4}$ and $R^{f5}$ is a $C_{1-8}$ perfluoroalkylene group; and $R^{f6}$ is a $C_{1-6}$ perfluoroalkylene group.

The mass average molecular weight of the sulfonic acid type perfluorocarbon polymer is preferably from $1 \times 10^4$ to $1 \times 10^7$, more preferably from $5 \times 10^4$ to $5 \times 10^6$. When the mass average molecular weight is at least $1 \times 10^4$, physical properties such as the degree of swelling are hardly changed with time, and a sufficient durability of an electrolyte membrane will be obtained. When the mass average molecular weight is at most $1 \times 10^7$, preparation of a solution and formation will be easy.

As a cation exchange resin made of a polymer other than the perfluorocarbon polymer, a copolymer having repeating units represented by the following formula (7) and repeating units represented by the following formula (8) may be mentioned.

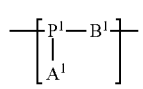  (7)

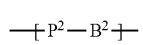  (8)

In the above formulae, $P^1$ is a phenyltolyl group, a biphenyltolyl group, a naphthalene tolyl group, a phenanthrenetolyl group or an anthracenetolyl group; $P^2$ is a phenylene group, a biphenylene group, a naphthylene group, a phenanthrylene group or an anthracylene group; $A^1$ is a —$SO_3M$ group, a —COOM group (wherein M is a hydrogen atom or an alkali metal atom) or a group capable of being converted to such a group by hydrolysis; each of $B^1$ and $B^2$ is an oxygen atom, a sulfur atom, a sulfonyl group or an isopropylidene group.

The metamerism of $P^1$ and $P^2$ is not particularly limited, and at least one of hydrogen atoms in $P^1$ and $P^2$ may be substituted by a fluorine atom, a chlorine atom, a bromine atom or a $C_{1-3}$ alkyl group.

The ion exchange capacity of the ion exchange resin is preferably from 0.5 to 2.0 meq/g dry resin, more preferably from 0.7 to 1.8 meq/g dry resin. When the ion exchange capacity is at least 0.5 meq/g dry resin, the resistance of an electrolyte membrane can be suppressed low. When the ion exchange capacity is at most 2.0 meq/g dry resin, affinity to water can be properly suppressed, and the electrolyte membrane will not be dissolved at the time of power generation.

(Non-Reinforced Layer)

The electrolyte membrane preferably has a non-reinforced layer made of an ion exchange resin, as one of or both of the outermost layers. When it has a non-reinforced layer, the resistance at an interface between the electrolyte membrane and an electrode can be suppressed low. The electrolyte membrane more preferably has a non-reinforced layer as outermost layers on both sides.

The thickness of the non-reinforced layer is preferably from 1 to 20 μm, more preferably from 2 to 15 μm, further preferably from 2 to 10 μm on each side. When the thickness is at least 1 μm, excellent gas barrier properties will be obtained. When the thickness is at most 20 μm, the resistance of the electrolyte membrane can be suppressed low, and favorable dimensional stability will be obtained.

Further, in the electrolyte membrane for a polymer electrolyte fuel cell, transfer of proton will be blocked by the fibers of the nonwoven fabric. If the non-reinforced layer is too thin, the distance over which the electric current avoids and goes around the fibers tends to be long, which may lead to an unnecessary increase in the resistance. Particularly when the thickness of the non-reinforced layer is at most half the average fiber diameter of the fibers of the nonwoven fabric, the increase in the resistance is likely to occur. When the thickness of the non-reinforced layer is at the same level as the average fiber diameter of the fibers of the nonwoven fabric, the distance over which the electric current goes around will be short, and an unnecessary increase in the resistance can be avoided resultingly.

The thickness of the non-reinforced layer is measured by observing the cross section of the electrolyte membrane by e.g. an optical microscope, a laser microscope or an electron microscope. The thickness of the non-reinforced layer means the minimum distance between the surface of the electrolyte membrane and the fibers of the nonwoven fabric.

The non-reinforced layer may contain a component which does not lead to an increase in the resistance, other than the nonwoven fabric.

(Method for Producing Electrolyte Membrane)

As a method for producing an electrolyte membrane, the following methods (α) to (γ) may be mentioned.

(α) A method of coating or impregnating the surface of the nonwoven fabric with a solution or a dispersion of an ion exchange resin, followed by drying.

(β) A method of laminating a preliminarily formed ion exchange resin membrane on the surface of the nonwoven fabric with heating to bond them.

(γ) A method of laminating a preliminarily formed ion exchange resin membrane on one surface of the nonwoven fabric with heating to bond them, and further coating the other surface of the nonwoven fabric with a solution or a dispersion of an ion exchange resin, followed by drying.

The electrolyte membrane obtained by the above method may further be subjected to e.g. stretching treatment for reinforcing.

The electrolyte membrane obtained by the above method preferably has a non-reinforced layer made of an ion exchange resin formed as an outermost layer. Further, by further coating the electrolyte membrane obtained by the above method with a solution or a dispersion of an ion exchange resin, or by laminating an ion exchange resin membrane on the above electrolyte membrane, a non-reinforced layer made of an ion exchange resin can also be formed.

Now, one example of the method for producing an electrolyte membrane by the method (γ) will be described.

The electrolyte membrane can be produced by a process having the following steps.

(IV) A step of coating the surface of a base material film with a solution or a dispersion of an ion exchange resin, followed by drying to obtain an ion-exchange resin membrane provided with the base material film.

(V) A step of passing the nonwoven fabric provided with the resin film obtained in the above-described step (III) and the ion exchange resin membrane provided with the base material film in a state where they are laminated, between a pair of rolls for hot pressing thereby to obtain a laminate.

(VI) A step of peeling the resin film from the laminate, and coating the surface on the nonwoven fabric side with a solution or a dispersion of an ion exchange resin, followed by drying to obtain an electrolyte membrane provided with the base material film.

Step (IV)

The surface of a base material film sent out from a roll for the base material film, is coated with a dispersion having an ion exchange resin dispersed in a dispersion medium, followed by drying to form an ion exchange resin membrane, which is wound on a roll for an ion exchange resin membrane together with the base material film.

The material of the base material film may, for example, be ETFE, PET or polypropylene, and is preferably ETFE in view of the durability.

The dispersion medium is preferably a dispersion medium containing an alcohol and water.

The alcohol may, for example, be methanol, ethanol, 1-propanol, 2-propanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol, 3,3,4,4,5,5,6,6,7,7,8,8,8-tridecafluoro-1-octanol.

As the coating method, a known method such as die coating may be mentioned.

The drying temperature is preferably from 40 to 130° C.

In order to stabilize the ion exchange resin membrane, the ion exchange resin membrane may be annealed. The temperature for annealing is preferably from 130 to 200° C.

Step (V)

The nonwoven fabric provided with the resin film sent out from the roll for the nonwoven fabric obtained in step (III) and the ion exchange resin membrane provided with the base material film sent out from the roll for the ion exchange resin membrane obtained in step (IV) are overlaid so that the nonwoven fabric and the ion exchange resin membrane are in contact with each other, and they are passed between a pair of heating rolls in such a state for hot pressing, and the obtained laminate are wound on a roil for the laminate.

The temperature of the heating rolls is preferably from 130 to 200° C.

The pressure for hot pressing is preferably from 0.1 to 5 MPa.

Step (VI)

The resin film is peeled from the laminate sent out from the roll for the laminate, and then the surface on the nonwoven fabric side is coated with a dispersion of an ion exchange resin, followed by drying to obtain an electrolyte membrane provided with a base material film.

The coating method may be a known method such as die coating.

The drying temperature is preferably from 40 to 130° C.

In order to stabilize the electrolyte membrane, the electrolyte membrane may be annealed. The temperature for annealing is preferably from 130 to 200° C.

The above-described electrolyte membrane of the present invention, which is reinforced by the nonwoven fabric of the present invention, is excellent in the dimensional stability when it is swollen by water, and the resistance by the reinforcing material will be suppressed.

<Membrane/Electrode Assembly>

Figure 5:
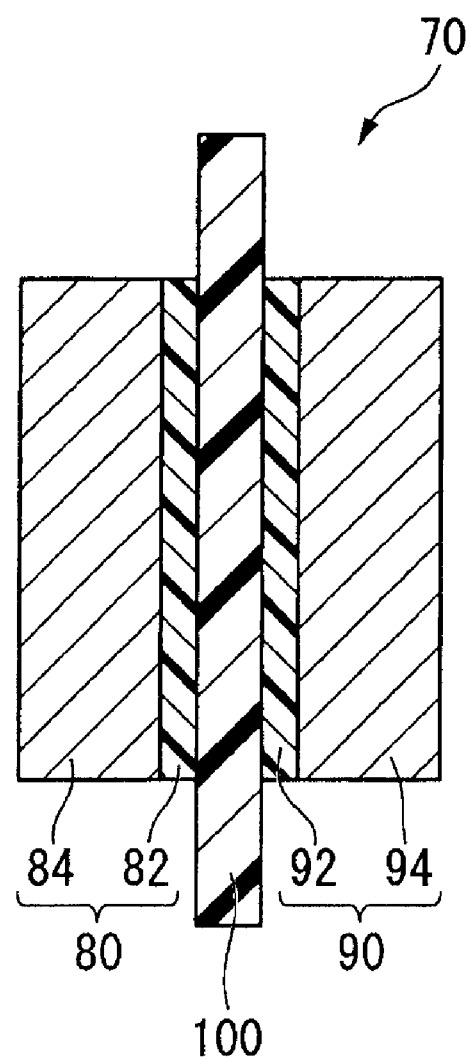
FIG. 5 is a cross sectional view illustrating one example of a membrane/electrode assembly for a polymer electrolyte fuel cell.

FIG. 5 is a cross sectional view illustrating one example of a membrane/electrode assembly (hereinafter referred to as a membrane/electrode assembly) for a polymer electrolyte fuel cell. A membrane/electrode assembly 70 comprise an anode 80 having a catalyst layer 82 and a gas diffusion layer 84, a cathode 90 having a catalyst layer 92 and a gas diffusion layer 94, and an electrolyte membrane 100 disposed to be in contact with the catalyst layers between the anode 80 and the cathode 90.

(Electrolyte Membrane)

The electrolyte membrane 100 is the electrolyte membrane of the present invention.

(Catalyst Layer)

The catalyst layer 82 and the catalyst layer 92 (hereinafter both will collectively be referred to as a catalyst layer) are a layer containing a catalyst and an ion exchange resin. The catalyst layer 82 and the catalyst layer 92 may be layers having the same component, composition; thickness, and the like, or may be different layers.

The catalyst may be one which accelerates the oxidation-reduction reaction in a fuel cell, and it is preferably a catalyst containing platinum, particularly preferably a supported catalyst having platinum or a platinum alloy loaded on a carbon support.

The carbon support may, for example, be activated carbon or carbon black.

The ion exchange resin may be the above-described ion exchange resin, and in view of excellent durability, it is preferably a sulfonic acid type perfluorocarbon polymer.

(Gas Diffusion Layer)

As a material constituting the gas diffusion layer 84 and the gas diffusion layer 94 (hereinafter both will collectively be referred to as a gas diffusion layer), a porous carbon sheet such as carbon paper, carbon cloth or carbon felt may be mentioned. The gas diffusion layer is preferably subjected to water-repellent treatment by e.g. polytetrafluoroethylene (hereinafter referred to as PTFE).

(Microporous Layer)

The membrane/electrode assembly may have a microporous layer (not shown) containing carbon and a binding resin between the catalyst layer and the gas diffusion layer.

By providing the microporous layer containing carbon particles as the main component between the catalyst layer and the gas diffusion layer, the pores of the gas diffusion layer are less likely to be clogged with water, whereby a decrease in the gas diffusion properties will be suppressed.

The carbon may, for example, be carbon black or carbon fibers.

The binding resin is preferably a water repellent nonionic fluoropolymer, particularly preferably PTFE.

(Process for Producing Membrane/Electrode Assembly)

The membrane/electrode assembly 70 is produced, for example, be the following process (x) to (z).

(x) A process of coating both sides of the electrolyte membrane 100 with a coating fluid for forming a catalyst layer, followed by drying to form a catalyst layer thereby to obtain a membrane/catalyst layer assembly, and sandwiching the membrane/catalyst layer assembly between gas diffusion layers.

(y) A process of coating one side of a sheet to be a gas diffusion layer with a coating fluid for forming a catalyst layer, followed by drying to form a catalyst layer thereby to obtain electrodes (anode 80, cathode 90), and sandwiching the polymer electrolyte membrane 100 between such electrodes.

(z) A process of coating one side of a base material film with a coating fluid for forming a catalyst layer, followed by drying to form a catalyst layer, transferring the catalyst layer on both sides of the electrolyte membrane 100 to obtain a membrane/catalyst layer assembly, and sandwiching the membrane/catalyst layer assembly between gas diffusion layers.

The electrolyte membrane 100 and the gas diffusion layer used in the processes (x) to (z) may be in the form of a sheet or may be in the form of a web (a continuous product).

The coating fluid for forming a catalyst layer is prepared by dispersing a catalyst in a solvent, and by dissolving or dispersing an ion exchange resin in the solvent.

The above-described membrane/electrode assembly has an electrolyte membrane which is excellent in the dimensional stability when it is swollen by water, of which an increase in the resistance by a reinforcing material is increased, and accordingly the assembly is excellent in the durability and provides high output.

<Polymer Electrolyte Fuel Cell>

The membrane/electrode assembly is used for a polymer electrolyte fuel cell. The polymer electrolyte fuel cell is produced, for example, by sandwiching the membrane/electrode assembly between two separators to form a cell, and stacking a plurality of cells.

As each separator, e.g. an electroconductive carbon plate having grooves to constitute paths for a fuel gas or an oxidizing gas containing oxygen (such as air or oxygen) formed, may be mentioned.

The polymer electrolyte fuel cell may, for example, be a hydrogen/oxygen type fuel cell or a direct methanol type fuel cell (DMFC).

EXAMPLES

Now, the present invention will be described in further detail with reference to Examples. However, it should be understood that the present invention is by no means restricted to such specific Examples.

Examples 1 and 2 are Examples of the present invention and Examples 3 to 6 are Comparative Examples.

(Proportion of Repeating Units)

The proportion of the respective repeating units constituting ETFE are obtained from the results of the measurement of the total fluorine amount and the melt $^{19}$F-NMR measurement.

(Storage Elastic Modulus E')

Dynamic viscoelasticity was measured with respect to an ETFE film having a width of 5 mm, a length of 30 mm and a thickness of 150 μm, using a dynamic viscoelasticity measuring apparatus (DVA200) manufactured by ITK Co., Ltd.) under conditions of a distance between chucks of 20 mm, measurement frequency of 1 Hz and a temperature raising rate of 2° C./min, and from the obtained graph of the storage elastic modulus E', the storage elastic modulus E' at 25° C. was read.

(Melt Viscosity)

An orifice having a diameter of 1 mm and a length of 10 mm was set on a capillary rheometer (capirograph manufactured by Toyo Seiki Seisaku-sho, Ltd., inner diameter: 9.55 mm), and molten ETFE was extruded under conditions of a cylinder temperature of 300° C. and a piston speed of 10 mm/min, whereby the melt viscosity was measured.

(Unit Weight of Nonwoven Fabric)

A PET film with an adhesive was pressed on a nonwoven fabric, and the nonwoven fabric was transferred. The unit weight was calculated from the transferred area and an increased mass.

(Average Fiber Diameter of Fibers)

The average fiber diameter of the fibers constituting a nonwoven fabric was an average value obtained by measuring fiber diameters of 200 fibers by observation with an electron microscope, and excluding values of the thinnest ten and thickest ten.

(Maximum Strength, Maximum Hardness)

Within one hour after the nonwoven fabric was densified, the nonwoven fabric was cut into a width of 100 mm and a length of 30 mm, and is subjected to a tensile test under conditions of a distance between chucks of 10 mm and a rate of pulling of 10 mm/min, thereby to measure the tensile strength per 10 cm with of the nonwoven fabric. The maximum value in a curve of the strength relative to the elongation is regarded as the maximum strength, and the maximum value of the slope of the curve at the initial stage was regarded as the maximum hardness.

(Rate of dimension change when the electrolyte membrane is swollen)

Two strips (2 cm×10 cm) were cut from the electrolyte membrane in each of the machine direction and the transverse direction to prepare samples. On each sample, lines with a distance of 6 cm in parallel with the short side direction were drawn.

Each sample was held in an atmosphere at a temperature of 25° C. under a humidity of 50% for 2 hours, and the length between the lines was measured.

Then, a tension of 20 mN was applied to one of the two samples, and a tension of 60 mN was applied to the other one, and in such a state, the samples were dipped in deionized water at 90° C. for 2 hours, and then the length between the lines was measured in the water.

In order to remove the influence by the tension from the elongation of the sample measured, the elongation of the sample when the tension becomes 0 is calculated in accordance with the following formula (9), and the average of the elongation in the machine direction and the elongation in the transverse direction was obtained, which was regarded as the rate of dimension change.

(Elongation with a tension 0 N)=(Elongation with a tension 20 mN)−{(Elongation with a tension 60 mN)−(Elongation with a tension 20 mN)}÷2     (9)

(ETFE)

ETFE-1:

Into an evacuated autoclave made of stainless steel having an internal capacity of 430 L, 391 kg of 1,3-dichloro-1,1,2,2,3-pentafluoropropane (manufactured by Asahi Glass Company, Limited, tradename: AK225cb, hereinafter referred to as AK225cb) and 3.0 kg of $CH_2=CH(CF_2)_4F$ were charged, interior of the autoclave was heated to 66° C. with stirring, a mixed gas of E/TFE=17/83 (mol %) was introduced until the pressure of the autoclave became 1.6 MPaG, and 2.5 L of a 0.3 mass % AK225cb solution of tert-butyl peroxypivalate as a polymerization initiator was charged to initiate the polymerization. During the polymerization, a mixed gas of E/TFE=46/54 (mol %) and $CH_2=CH(CF_2)_4F$ in an amount corresponding to 1.4 mol % based on the mixed gas were continuously added so that the pressure would be 1.6 MPaG, and after 30 kg of the E/TFE mixed gas was charged, the autoclave was cooled, and residual gas was purged to terminate the polymerization.

The obtained ETFE-1 in the form of a slurry was put into a 850 L granulation tank in which 340 kg of water was charged and heated to 105° C. with stirring, for granulation while the solvent was distilled off and removed. The obtained granulated product was dried at 150° C. for 5 hours to obtain 30 kg of ETFE-1. The proportions of the respective repeating units, the storage elastic modulus E' and the melt viscosity measured at 300° C. are shown in Table 1.

ETFE-2:

Into an evacuated autoclave made of stainless steel having an internal capacity of 1.2 L, 1,202 g $CF_3(CF_2)_5H$, 19.5 g of methanol, 3.5 g of $CH_2=CH(CF_2)_4F$ and 164 g of E/TFE=17/83 (mol %) were charged, the interior of the autoclave was heated to 66° C. with stirring, whereupon the pressure in the autoclave became 1.5 MPaG. Then, 4 mL of a 1.0 mass % $CF_3(CF_2)_5H$ solution of tert-butyl peroxypivalate as a polymerization initiator was charged to initiate the polymerization. During the polymerization, a mixed gas of E/TFE=46/54 (mol %) and $CH_2=CH(CF_2)_4F$ in an amount corresponding to 0.7 mol % based on the mixed gas were continuously added so that the pressure would be 1.5 MPaG, and after 90 g of the E/TFE mixed gas was charged, the autoclave was cooled, and residual gas was purged to terminate the polymerization.

The obtained ETFE in the form of a slurry was put in a rotary evaporator, and the solvent was evaporated to obtain powdery ETFE. The obtained powdery ETFE was dried at 150° C. for 15 hours to obtain 87 g of ETFE-2. The proportions of the respective repeating units, the storage elastic modulus E' and the melt viscosity measured at 300° C. are shown in Table 1.

ETFE-3:

Into an evacuated autoclave made of stainless steel having an internal capacity of 430 L, 393 kg of AK225cb and 2.2 kg of $CH_2=CH(CF_2)_4F$ were charged, the interior or the autoclave was heated to 66° C. with stirring, a mixed gas of E/TFE=16/84 (mol %) was introduced until the pressure in the autoclave became 1.45 MPaG, and 2.0 L of a 0.3 mass % AK225cb solution of tert-butyl peroxypivalate as a polymerization initiator was charged to initiate the polymerization. During the polymerization, a mixed gas of E/TFE=46/54 (mol %) and $CH_2=CH(CF_2)_4F$ in an amount corresponding to 1.4 mol % based on the mixed gas were continuously added so that the pressure would be 1.45 MPaG, and after 30 kg of the E/TFE mixed gas was charged, the autoclave was cooled, and residual gas was purged to terminate the polymerization.

The obtained ETFE-3 in the form of a slurry was put into a 850 L granulation tank in which 340 kg of water was charged, and then heated to 105° C. with stirring for granulation while the solvent was distilled off and removed. The obtained granulated product was dried at 150° C. for 5 hours to obtain 27 kg of ETFE-3. The proportions of the respective repeating units, the storage elastic modulus E' and the melt viscosity measured at 300° C. are shown in Table 1.

ETFE-4:

Into an evacuated autoclave made of stainless steel having an internal capacity of 94 L, 87.3 kg of AK225cb and 860 g of $CH_2=CH(CF_2)_4F$ were charged, the interior of the autoclave was heated to 66° C. with stirring, a mixed gas of E/TFE=11/89 (mol %) was introduced until the pressure in the autoclave became 1.4 MPaG, and 677 g of a 1 mass % AK225cb solution of tert-butyl peroxypivalate as a polymerization initiator was charged to initiate the polymerization. During the polymerization, a mixed gas of E/TFE=40/60 (mol %) and $CH_2=CH(CF_2)_4F$ in an amount corresponding to 3.3 mol % based on the mixed gas were continuously added so that the pressure would be 1.4 MPaG, and after 7.1 kg of the E/TFE mixed gas was charged, the autoclave was cooled, and residual gas was purged to terminate the polymerization.

The obtained ETFE-4 in the form of a slurry was put into a 200 L granulation tank in which 77 kg of water was charged, and heated to 105° C. with stirring for granulation while the solvent was distilled off and removed. The obtained granulated product was dried at 150° C. for 5 hours to obtain 7.0 kg of ETFE-4. The proportions of the respective repeating units, the storage elastic modulus E' and the melt viscosity measured at 300° C. are shown in Table 1.

ETFE-5:

ETFE (manufactured by Asahi Glass Company, Limited, tradename: FLUON (registered trademark)•LM-ETFE•LM-740A) was prepared. The storage elastic modulus E' and the melt viscosity measured at 300° C. are shown in Table 1.

ETFE-6:

ETFE (manufactured by Asahi Glass Company, Limited, tradename: FLUON (registered trademark)•C88AXM) was prepared. The storage elastic modulus E' and the melt viscosity measured at 300° C. are shown in Table 1.

TABLE 1

| | Repeating units (mol %) | | | Storage elastic modulus E' at 25° C. (Pa) | Melt viscosity at 300° C. (Pa · s) |
|---|---|---|---|---|---|
| ETFE | E | TFE | $CH_2=CH(CF_2)_4F$ | | |
| ETFE-1 | 45.3 | 53.4 | 1.3 | $1 \times 10^9$ | 67 |
| ETFE-2 | 46.0 | 53.4 | 0.6 | $1 \times 10^9$ | 200 |
| ETFE-3 | 45.5 | 53.5 | 1.0 | $1 \times 10^9$ | 41 |
| ETFE-4 | 40.3 | 57.2 | 2.5 | $7 \times 10^8$ | 18 |
| ETFE-5 | — | — | — | $7 \times 10^8$ | 700 |
| ETFE-6 | — | — | — | $1 \times 10^9$ | 750 |

Example 1

Step (I)

A nonwoven fabric production apparatus 10 as shown in FIG. 1 was prepared.

As an extrude 12, a single screw extruder (manufactured by TANABE PLASTIC CO., LTD., diameter of barrel: 30 mm, L/D=24) was used.

As a die 14, a special die having a flow rate controlling structure and a hot air blowing structure was used.

As a spinning nozzle 20, a special nozzle for meltblow nonwoven fabric production (manufactured by Kasen Nozzle MFG. Co., Ltd.) having ten circular molten resin outlets (inner diameter: 400 μm) disposed in a line with an effective width of 5 cm, and gas outlets (width: 1 mm) in the form of a slit, capable of blowing hot air so as to apply stretching stress on the molten resins in parallel with the disposed molten resin outlets, was used.

As shown in FIG. 3, ETFE-1 was discharged from the spinning nozzle 20 under the following conditions and stretched to obtain a fiber 26, and the fiber 26 was collected on the surface of a film form base material 34 (70 mesh stainless steel mesh) moving at a rate of 0.2 m/min, located above a suction apparatus 40 having a suction pump, to form a nonwoven fabric 28 with a width of about 5 cm.

Rotational speed of extruder: 1 rpm
Die temperature: 360° C.
Temperature of hot air: 230° C.
Flow rate of hot air: 3 $Nm^3$/hr per 1 cm of nozzle
Flow rate of molten resin from excess resin exhaust port of extruder: 3.7 g/min
Flow rate of molten resin from spinning nozzle: about 0.3 g/min The temperature of hot air was the temperature which the nozzle reached when the nozzle was heated only with hot air.

Step (II)

The nonwoven fabric 28 was moved to the vicinity of the terminal on the top surface of a belt conveyor 30 at a rate of 0.2 m/min together with the film form base material 34.

The nonwoven fabric 28 (length: 3 m) was attached to a resin film 54 (PET film, thickness: 100 μm) and then wound on a roll 58 together with the resin film 54.

Step (III)

As shown in FIG. 4, the nonwoven fabric 28 with the resin film 54 sent out from the roll 58 was passed through a pair of heating rolls i.e. a metal roll 62 and a rubber roll 64 under the following conditions for hot pressing to obtain a nonwoven fabric 66 having its thickness adjusted, which was wound on a roll 68 for nonwoven fabric together with the resin film 54. The unit weight, the average fiber diameter, and the maximum strength and the maximum hardness in the machine direction per 100 $g/m^2$ of unit weight, of the nonwoven fabric, were measured. The results are shown in Table 2.

Temperature of metal roll: 210° C.
Temperature of rubber roll: 110° C.
Pressure: 15,000 N per a roll face of 600 mm
Feed rate: 0.15 m/min Step (IV):

On the surface of a base material film (ETFE film), manufactured by Asahi Glass Company, Limited, tradename: AFLEX (registered trademark) 100 N, thickness: 100 μm) sent out from a roll for base material film, an ethanol solution (FSS-2, solid content concentration: 9 mass %) of an ion exchange resin (manufactured by Asahi Glass Company, Limited, tradename: Flemion (registered trademark)) was applied by die coating and dried at 80° C. for 5 minutes to form an ion exchange resin membrane of 3 μm, which was wound on a roll for ion exchange resin membrane together with the base material film.

Step (V)

The nonwoven fabric with the resin film sent out from the roll for nonwoven fabric, obtained in Step (III), and the ion exchange resin membrane with the base material film sent out from the roll for ion exchange resin membrane, obtained in Step (IV), were overlaid so that the nonwoven fabric and the ion exchange resin membrane were in contact with each other, and they were passed between the above heating rolls under the following conditions for hot pressing, and the obtained laminate was wound on a roll for laminate.

Temperature of metal roll: 120° C.
Temperature of rubber roll: 120° C.
Pressure: 0.026 MPa/m per a roll face of 600 mm
Feed rate: 0.15 m/min Step (VI)

The resin film was peeled from the laminate sent out from the roll for laminate, and on the surface on the nonwoven fabric side, an ethanol solution (FSS-2, solid content concentration: 9%) of an ion exchange resin (manufactured by Asahi Glass Company, Limited, tradename: Flemion (registered trademark)) was applied by die coating and dried at 80° C. for 15 minutes, and was further pressurized by heating rolls. Then, the laminate was cut into a sheet, the residual solvent and the like were further removed at 140° C. for 30 minutes to obtain an electrolyte membrane having a thickness of 16 μm. From observation of the cross section with an electron microscope, the thickness of the non-reinforced layer on each surface was about 3 μm, and the thickness of the reinforced layer was 10 μm. The rate of change of dimension when the electrolyte membrane contained water was measured. The results are shown in Table 2.

Example 2

The same operation as in Example 1 was carried out except that ETFE-1 was changed to ETFE-2 to obtain a densified nonwoven fabric and then an electrolyte membrane.

Of the nonwoven fabric, the unit weight, the average fiber diameter, and the maximum strength and the maximum hardness in the machine direction per 100 $g/m^2$ of unit weight are shown in Table 2.

The rate of change of dimension when the electrolyte membrane contained water is shown in Table 2.

Example 3

The same operation as in Example 1 was carried out except that ETFE-1 was changed to ETFE-3 to obtain a densified nonwoven fabric and then an electrolyte membrane.

Of the nonwoven fabric, the unit weight, the average fiber diameter, and the maximum strength and the maximum hardness in the machine direction per 100 $g/m^2$ of unit weight are shown in Table 2.

The rate of change of dimension when the electrolyte membrane contained water is shown in Table 2.

Example 4

A nonwoven fabric is produced in the same manner as in Example 1 except that ETFE-4 is used, and the die temperature is set at 360° C. and the temperature of hot air at 360° C. Then, the nonwoven fabric is simply densified by means of a hot press machine at 160° C. under 1 MPa. Of the obtained nonwoven fabric, the unit weight, the average fiber diameter, and the maximum strength and the maximum hardness in the machine direction per 100 $g/m^2$ of unit weight are values as shown in Table 2.

An electrolyte membrane is produced in the same manner as in Example 1 and the rate of change of dimension is measured, whereupon a value shown in Table 2 is obtained.

Example 5

A densified nonwoven fabric was produced in the same manner as in Example 4 using ETFE-5. Of the nonwoven fabric, the unit weight, the average fiber diameter, and the maximum strength and the maximum hardness in the machine direction per 100 g/m² of unit weight are shown in Table 2.

An electrolyte membrane was produced in the same manner as in Example 1. The rate of change of dimension when the electrolyte membrane contained water is shown in Table 2.

Example 6

A densified nonwoven fabric is produced in the same manner as in Example 1 using ETFE-6. Of the obtained nonwoven fabric, the unit weight, the average fiber diameter, and the maximum strength and the maximum hardness in the machine direction per 100 g/m² of unit weight are values as shown in Table 2. Since the fiber diameter is large, the thickness of the nonwoven fabric is thick, and accordingly no electrolyte membrane can be produced.

TABLE 2

| Ex. | ETFE | Nonwoven fabric | | | | Electrolyte membrane Rate of dimension change (%) |
|---|---|---|---|---|---|---|
| | | Unit weight (g/m²) | Average fiber diameter (μm) | Maximum strength (N/10 cm) | Maximum hardness (N/10 cm) | |
| 1 | ETFE-1 | 8 | 1.5 | 80.5 | 866 | 4 |
| 2 | ETFE-2 | 8 | 2.0 | 95 | 880 | 2.5 |
| 3 | ETFE-3 | 4 | 1.2 | 14 | 92 | 20 |
| 4 | ETFE-4 | 7 | 2.0 | 50 | 320 | 15 |
| 5 | ETFE-5 | 5 | 6 | 54 | 354 | 13 |
| 6 | ETFE-6 | 70 | 12 | 99 | 891 | — |

INDUSTRIAL APPLICABILITY

The nonwoven fabric of the present invention is particularly useful as a reinforcing material of an electrolyte membrane for a polymer electrolyte fuel cell, a filter, a heat insulating material, a moisture penetration water proof material and a fire retardant material.

This application is a continuation of PCT Application No. PCT/JP2010/052999, filed on Feb. 25, 2010, which is based upon and claims the benefit of priority from Japanese Patent Application No. 2009-044704 filed on Feb. 26, 2009. The contents of those applications are incorporated herein by reference in its entirety.

MEANING OF SYMBOLS

26: Fiber
28: Nonwoven fabric
66: Nonwoven fabric
100: Electrolyte membrane

What is claimed is:

1. A nonwoven fabric, comprising:
fibers of an ethylene/tetrafluoroethylene copolymer;
wherein
the ethylene/tetrafluoroethylene copolymer comprises repeating units based on a monomer represented by $CH_2=CX(CF_2)_nY$ wherein each of X and Y is a hydrogen atom or a fluorine atom, and n is an integer of from 2 to 8,
and a content of the repeating units based on the monomer is from 0.1 to 7 mol % based on the total repeating units of the ethylene/tetrafluoroethylene copolymer;
a storage elastic modulus E' at 25° C. of the ethylene/tetrafluoroethylene copolymer of the fiber is at least 8×108 Pa;
a melt viscosity of the ethylene/tetrafluoroethylene copolymer of the fiber, measured at 300° C., is higher than 60 Pas and at most 300 Pas; and
an average fiber diameter of the ethylene/tetrafluoroethylene copolymer fibers is from 0.01 to 3 μm.

2. The nonwoven fabric according to claim 1, wherein a unit weight is from 1 to 300 g/m².

3. The nonwoven fabric according to claim 1, which is produced by meltblow process.

4. The nonwoven fabric according to claim 1, wherein at least part of intersections among the fibers are fixed by fusion.

5. The nonwoven fabric according to claim 4, wherein the fusion is carried out by hot pressing.

6. The nonwoven fabric according to claim 1, wherein a maximum strength in the machine direction per 100 g/m² of unit weight is at least 60 N/10 cm.

7. The nonwoven fabric according to claim 1, wherein a maximum hardness in the machine direction per 100 g/m² of unit weight is at least 400 N/10 cm.

8. An electrolyte membrane reinforced by the nonwoven fabric as defined in claim 1.

9. The nonwoven fabric according to claim 1, wherein an average fiber diameter of the fibers of the nonwoven fabric is from 0.01 to 3 μm.

10. The nonwoven fabric according to claim 1, wherein the melt viscosity of the ethylene/tetrafluoroethylene copolymer of the fiber, measured at 300° C. is from 65 Pas to 200 Pas.

* * * * *